United States Patent [19]

Benecke

[11] 3,717,254
[45] Feb. 20, 1973

[54] MID-BED DISTRIBUTOR
[75] Inventor: Norman L. Benecke, Garfield, N.J.
[73] Assignee: Westinghouse Electric Corporation, Pittsburgh, Pa.
[22] Filed: Feb. 19, 1971
[21] Appl. No.: 116,876

[52] U.S. Cl. .................................................. 210/279
[51] Int. Cl. ............................................. B01d 23/10
[58] Field of Search.......... 210/35, 81, 274, 275, 279, 210/289, 80

[56] References Cited
UNITED STATES PATENTS 1,794,841  3/1931  Elfreth..............................210/274 X
2,771,424  11/1956  Stromquist et al..................210/35 X Primary Examiner—Samih N. Zaharna
Attorney—A. T. Stratton, Z. L. Dermer and M. B. L. Hepps

[57] ABSTRACT

The mid-bed distributor of a mixed resin ion exchange demineralizer is supported on springs so that it can assume a first position during normal operations and a second predetermined position during ion bed regeneration.

4 Claims, 2 Drawing Figures

PATENTED FEB 20 1973 3,717,254

WITNESSES
Edwin L. Bassler
James F. Young

INVENTOR
Norman L. Benecke
BY
ATTORNEY

3,717,254

MID-BED DISTRIBUTOR

BACKGROUND OF THE INVENTION

This invention pertains to fluid distributors, and more particularly to a fluid distributor which may be utilized during regeneration of mixed resin ion exchange demineralizers.

Mixed resin ion exchangers have been utilized for demineralization for some time. The resins in such exchangers are subject to degeneration of effectiveness with use and must be regenerated from time to time.

During regeneration, the bed is first backwashed to separate the resins as to their anion and cation characteristics, as is well known in the art. A first chemical, such as sodium hydroxide is then conveyed through the upper anion bed and drawn-off through the mid-bed distributor. A second chemical, such as sulfuric acid, is subsequently fed through the lower cation bed by way of the mid-bed distributor. The two essentially separate operations regenerate the bed which is then remixed for normal operations.

The mid-bed distributor, if unsupported, would naturally assume a first position during normal operations and a second position, displaced from the first position, during backwashing. The second position must be at the interface of the anion and cation resins.

Heretofore, it was the practice of the art to support the mid-bed distributor at the second position which can be determined by known calculations. The problem thus presented to the prior art was how to maintain this position during normal operations during which high forces tended to move the distributor to the first position. The solution was a relatively complex and expensive, welded and bolted, support system which sometimes failed under the stress levels developed.

SUMMARY OF THE INVENTION

The above complex fixed support system can be eliminated by providing a spring support system for biasing the mid-bed distributor toward the second position while allowing it to assume the first position during normal operations. The stress levels associated with the fixed support system for the mid-bed distributor of an ion exchanger can be eliminated simply by allowing the distributor to move on springs.

The mid-bed distributor comprises a central manifold through which chemicals can seek ingress or egress by way of a flexible conduit extending to the exterior of the ion exchange tank. The central manifold supports a plurality of closed-ended and circumferentially perforated pipes which are further supported proximate their outer ends by tying to angle irons. The angle irons are, in turn, hung by springs from clips welded to the tank wall.

DESCRIPTION OF THE DRAWINGS

For a better understanding reference may be had to the accompanying illustrative embodiment, in which.

DESCRIPTION OF A PREFERRED EMBODIMENT

Figure 1:
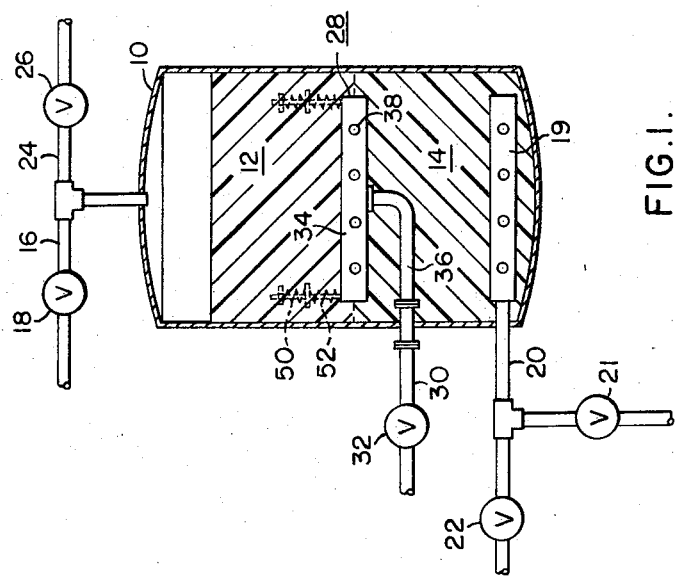
FIG. 1 is a sectional view of an ion exchanger system.

Referring to FIG. 1, there can be seen a tank 10 of the type which contains a mixed bed of both anion and cation resins which are used for demineralization and the like. As depicted the resins have been separated by backwashing in preparation for regeneration. The anion resins occupy an upper portion of the tank 10, generally designated by the numeral 12, and the cations occupy the lower region, generally designated by the numeral 14.

During normal operations, the fluid to be demineralized is permitted ingress to the mixed resin bed within the tank 10 via conduit 16 and valve 18. The fluid seeks egress from the tank 10 collection header 19 via conduit 20 and valve 22.

During regeneration the bed as indicated is backwashed via valve 21 so as to separate the resins as to their anion and cation characteristics into regions 12 and 14 as depicted. A first chemical, such as sodium hydroxide, is fed through the anion region 12 via conduit 24 and valve 26. The chemical should not be allowed to contact the cation resins in region 14. Therefore, a mid-bed distributor, designated by the numeral 28, is used to draw off the sodium hydroxide via a conduit 30 and valve 32. At the completion of this operation, a second chemical, such as sulfuric acid, is fed to the interior of the tank via conduit 30 and mid-bed distributor 28. The sulfuric acid is drawn-off through a collection header 19 by way of conduit 20 and thus contacts only the cations in lower region 14 of the tank 10.

As was previously indicated, during normal operations the mid-bed distributor 28 is surrounded by a bed of mixed resins having flow downwardly therethrough. The mid-bed distributor 28 is thus tended to be pushed toward a first lower position during these normal operations. However, when the bed is backwashed in order to regenerate same, according to the scheme set forth above, the mid-bed distributor 28 should be at the interface of the regions 12 and 14. The interface, because of the separation of the beds and the lack of downward pressure thereon, tends to be at a second position which is displaced upwardly from the first position.

Figure 2:
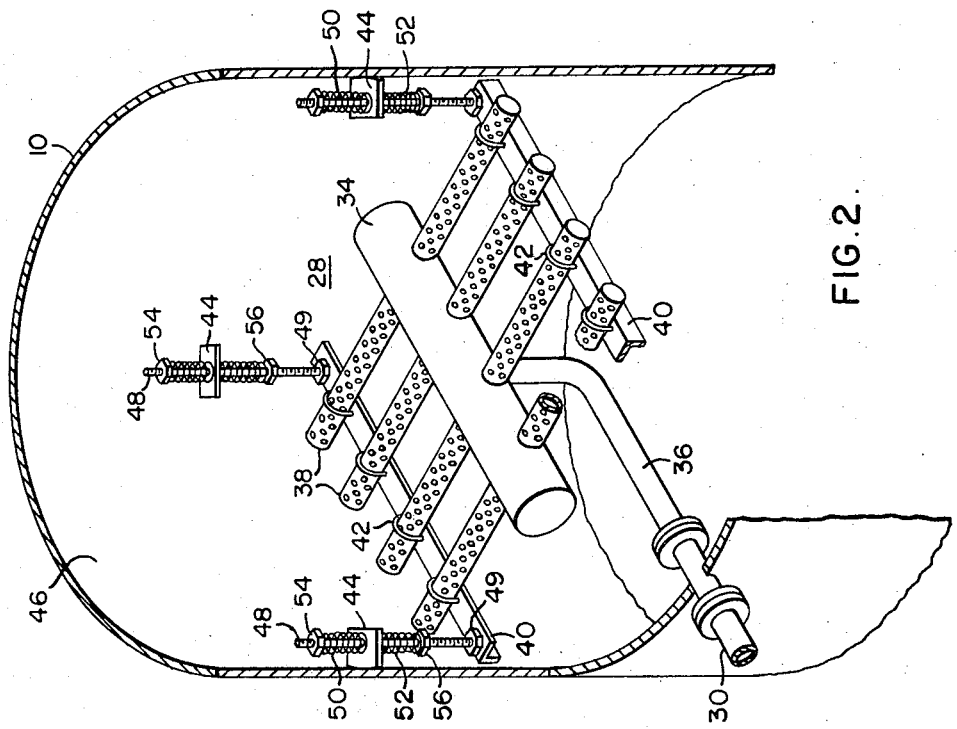
FIG. 2 shows an isometric view of a suitable suspension system in accordance with this invention.

In accordance with this invention, it is desired that the mid-bed manifold be supported in a flexible manner so that it can move without building up high stresses in the support structure. Referring to FIG. 2, it can be seen that the mid-bed distributor 28 consists of a distribution manifold 34 through which fluid may seek ingress or egress from the tank 10 through a flexible line 36 inside of the tank 10; which line 36 is coupled to conduit 30 on the exterior of the tank. The manifold 34 has a plurality of close-ended and circumferentially perforated pipes 38 supported thereon and extending generally perpendicularly therefrom. The pipes 38 are tied together proximate their outward extremity by channel section 40 and U-bolts 42.

A number of clips 44 are welded to the inside wall 46 of the tank 10. In accordance with this invention the mid-bed distributor is supported from the clips 44 by flexible means. One suitable manner of constructing these flexible means is to pass long bolts 48 through holes in the clips 44 which bolts 48 are tied to the channel sections 40; as by welding or nuts 49, as shown.

Two springs 50 and 52 may then be placed on either side of the clips 40 and their tensioning adjusted by stops 54 and 56 to properly position the mid-bed distributor with respect to the clips 44.

As can be seen, by utilizing springs of chosen spring constants and adjusting their length with the adjustable stops 54 and 56, the position of the mid-bed distributor 28 can be varied to lie precisely at the interface of the anion and cation regions 12 and 14, respectively, after backwashing. The structure shown further allows the mid-bed distributor 28 to assume what position it will during normal operations without building up intolerable stresses in the supporting structure.

Although the mode of constructing the flexible support structure tying the clips 44 to the mid-bed distributor 28 is preferably as depicted in FIG. 2 and described above, primarily because of the adjustability which is inherent in this design, on smaller units the channel sections 40 may be supported from the clips 44 by simply welding coil springs therebetween.

Therefore, I claim:

1. A demineralizing tank useful in fluid conditioning systems comprising:
   a tank containing multiple beds of ion exchange resins;
   a fluid inlet and outlet connected to opposite ends of the tank for permitting fluid to flow from the inlet over the resins and become demineralized prior to discharge out the outlet;
   a distributor positioned between the beds of resins in the tank, said distributor having a flexible conduit connected at one end to the distributor and terminating at its other end outside the tank, the flexibility of said conduit being sufficient to accommodate movement of the distributor when exposed to the flow of tank fluids;
   said distributor further having multiple openings which receive or discharge a solution passed in ion exchange relationship with the resins during regeneration of the resins; and
   means resiliently supporting said distributor on the tank to thereby permit displacement of said distributor as varying magnitudes of pressure are exerted thereon by fluid flow through the tank.

2. The combination according to claim 1 wherein the resilient means comprises springs supported on the tank walls; and
   adjustable means interconnecting said springs with the distributor for selectively locating the distributor in said tank.

3. The combination according to claim 2 wherein said springs are positioned on opposite sides of clips spaced at intervals and attached to the tank inner walls; and
   said adjustable means includes a bolt extending through each of said springs and clips, and
   an adjustable stop threaded on opposite ends of said bolts for compressing its associated springs in an amount corresponding to the degree of displacement desired for the distributor.

4. The combination according to claim 3 wherein said distributor is mounted on movable support means and said bolts are connected to the support means for holding the distributor in said tank.

* * * * *